United States Patent Office 2,733,078
Patented Jan. 31, 1956

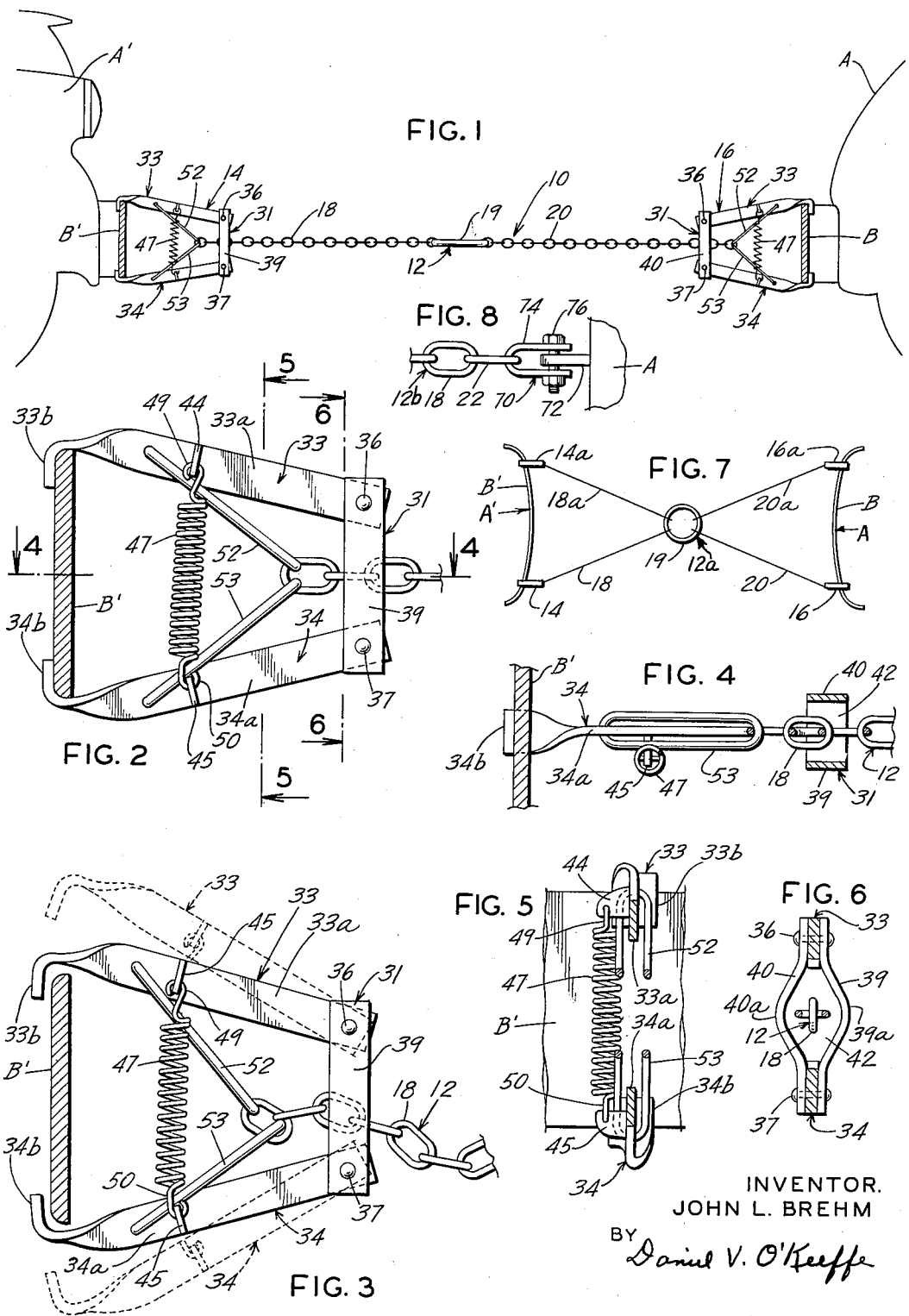

2,733,078

VEHICLE TOWING DEVICE

John L. Brehm, Timber Lake, S. Dak.

Application May 11, 1953, Serial No. 354,033

2 Claims. (Cl. 280—480)

This invention relates to towing devices and, more specifically, to towing devices which are particularly well adapted for use in towing automobiles and the like.

Towing devices have heretofore been known in the art but such devices have had certain inherent disadvantages such as, for example, being unreliable in operation, being bulky or cumbersome in size, being difficult to handle and use, or the like.

It is a primary object of my invention to afford a novel towing device which overcomes the aforementioned, and other, difficulties of towing devices heretofore known in the art.

It is a further object of my invention to afford a novel towing device which may quickly and easily be attached to suitable structural members embodied in automobiles, and the like, such as, for example, bumpers, axles, frame members, and the like.

Another object of my invention is to afford a novel towing device of the aforementioned type wherein the parts are constituted and arranged in a novel and expeditious manner whereby, during a towing operation, the towing device is positively engaged with the structural members in a manner wherein the greater the strain or pull on the device, the more firmly it is engaged with the structural members to which it is attached.

Yet another object of my invention is to afford a novel towing device of the aforementioned type which may be readily initially engaged with structural members and when so engaged is firmly but yieldingly engaged therewith, and when pull is exerted on the device, it is automatically positively clamped in firm engagement with the structural members.

A further object of my invention is to afford a novel towing device which is effective in operation and may be readily and economically constructed commercially.

Other and further objects of the present invention will be apparent from the following description and claims and are illustrated in the accompanying drawings which, by way of illustration show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a towing device embodying the principles of my invention, showing the towing device disposed in towing position between bumpers of two automobiles;

Fig. 2 is an enlarged detail view of a portion of the towing device shown in Fig. 1;

Fig. 3 is an enlarged detail view, similar to Fig. 2, but showing the parts of the towing device disposed in different positions;

Fig. 4 is a sectional view taken substantially along the line 4—4 in Fig. 2;

Fig. 5 is a sectional view taken substantially along the line 5—5 in Fig. 2;

Fig. 6 is a sectional view taken substantially along the line 6—6 in Fig. 2;

Fig. 7 is a diagrammatic illustration of another manner in which a towing device embodying the principles of my invention may be mounted between two vehicles for use; and Fig. 8 is a detail sectional view showing a different manner of attaching a towing device embodying the principles of my invention to a tow-vehicle.

A towing device 10, embodying the principles of my invention, is shown in the drawings to illustrate a preferred embodiment of my invention. The towing device 10 comprises, in general, a tow line 12 on the opposite ends of which are mounted clamps 14 and 16, respectively, which are adapted to be operatively engaged with structural members such as, for example, bumpers, axles, or frame members, of two automobiles, or the like, for the purpose of towing one of the vehicles by the other.

The tow line which I prefer to use, and which is shown in the drawings, is made up of two lengths of chain 18 and 20 respectively, connected together at one end by a ring 19, Fig. 1, intermediate the length of the tow line 12.

However, it will be appreciated by those skilled in the art that other suitable tow lines such as, for example, cables, other types of chains, or the like, may be substituted for the particular tow line 12 shown in the drawings without departing from the purview of my invention.

The clamps 14 and 16 are identical and, therefore, it is only necessary to describe the construction of one of the clamps, namely, the clamp 14, and, in the drawings, the same reference numerals are applied to the same parts in each of the clamps 14 and 16.

Thus, it will be noted that clamp 14, Figs. 1, 2, and 3, comprises in general, an elongated base 31 having two substantially L-shaped hooks or clamping members 33 and 34, made of suitable material such as steel, pivotally mounted on respective opposite end portions thereof. The hooks 33 and 34 each have a long leg 33a and 34a, respectively, and a short leg 33b and 34b projecting inwardly toward each other from the free ends of the legs 33a and 34a, respectively. The other end portions of the legs 33a and 34a, Fig. 2, are pivotally connected to the opposite ends of the base 31 by suitable means such as rivets 36 and 37, respectively.

The base 31 comprises two elongated bars or plates 39 and 40 of any suitable material such as plate steel, which are of equal length and are disposed in substantially parallel spaced relation to each other, Fig. 6, with the ends of the hooks 33 and 34 opposite to the short legs 33b and 34b being mounted in opposite ends of the base 31 between the bars 39 and 40, and being pivotally connected to the bars 39 and 40 by the rivets 36 and 37, respectively, Figs. 2 and 6. The central portions 39a and 40a of the bars 39 and 40, respectively, are bowed outwardly away from each other, Fig. 6, to thereby afford a passageway or channel 42 through which the tow line 12 may extend as will be discussed in greater detail presently.

Two lugs or ears 44 and 45, Figs. 2 and 5, project laterally from the central portion of the legs 33a and 34a, respectively, of the hooks 33 and 34. A tension coil spring 47 is disposed between the lugs 44 and 45 and is connected thereto by suitable fastening means such as hooks 49 and 50, respectively, on the opposite ends of the spring 47.

Two elongated links 52 and 53 are connected to the hooks 33 and 34, the link 52 having one end portion extending through the long leg 33a between the lug 44 and the short leg 33b, and the link 53 having one end portion extending through the long leg 34a between the lug 45 and the short leg 34b. The links 52 and 53 extend inwardly past the spring 47, and the other end portions thereof extend through and are connected to the link in the end of the chain 18 opposite to the end on which the ring 19 is mounted. It will be understood, of course, that the links 52 and 53 of the clamp 16 are connected to the end link of the chain 20 rather than to the chain 18.

With this construction, it will be seen that the spring 47 is effective to yielding urge the short legs 33b and 34b of the hooks 33 and 34, respectively, toward each other into the position shown in solid lines in Fig. 3 while still permitting the hooks 33 and 34 to be manually pivoted around the rivets 36 and 37 against the urging of the spring 47 toward the open position shown in broken lines in Fig. 3 wherein the short legs 33b and 34b are disposed a greater distance from each other. This, it will be seen, permits relative pivoting of the hooks 33 and 34, by the operator, into an open position which enables the clamp 14 to be readily mounted on a structural member in position to clamp the structural member between the hooks or clamping members 33 and 34. Thus it will be seen that with the hooks 33 and 34 disposed in open position such as shown in broken lines in Fig. 3, a structural member of an automobile, such as the bumper B, may readily pass through the space between the legs 33b and 34b into such position between the legs 33a and 34a that it may be engaged between the legs 33a and 34a when the hooks 33 and 34 are released by the operator and are returned by the spring 47 toward closed position, as shown in solid lines in Fig. 3. In this latter position, the structural member is engaged between the hooks 33 and 34 inwardly of the legs 33b and 34b in such position that the legs 33b and 34b afford effective stop members for preventing the accidental displacement of the clamp 14 from the structural member.

It will be appreciated by those skilled in the art that although I have shown the clamps 14 and 16 with both of the hook members 33 and 34 movably mounted on the base 31, this being the preferred form of my invention, this is merely by way of illustration and it is relative movement between the hooks 33 and 34 which is important, and one of the hooks 33 or 34 may be fixedly mounted on the base 31 and the other hook 34 or 33 be movably mounted on the base 31, to thereby afford the relative movement between the hooks 33 and 34, without departing from the purview of my invention.

In the operation of the novel towing device shown in Fig. 1, the clamp 14 may be disposed in clamping engagement with a suitable structural member of a vehicle to be towed such as, for example, the bumper B' of an automobile A', Fig. 1, by pivoting the hooks 33 and 34 about the rivets 36 and 37 and against the urging of the spring 47 into the open position shown in broken lines in Fig. 3 and, after moving the clamp 14 into position wherein the short legs 33b and 34b are disposed inwardly of the A structural member, releasing the hooks 33 and 34 to thereby permit the spring 47 to swing the legs 33 and 34 inwardly into the closed position shown in solid lines on Fig. 3. In this latter position, the hooks 33 and 34 are yieldingly clamped on the bumper B' with the short legs 33b and 34b disposed inwardly of the bumper B' and in operative engagement therewith to prevent accidental displacement of the clamp 14 from the bumper B'.

By a similar operation, the clamp 16 may be connected to a suitable structural member of the vehicle which is to do the towing, such as, for example, the bumper B on the automobile A, Fig. 1. The automobile A may then be moved forwardly to take up the slack, Fig. 3, in the chain 12, and when tension is placed on the chain 12 between the link 52 and 53 on the clamp 14 and the link 52 and 53 on the clamp 16, the tension exerted on the respective links 52 and 53 is effective to further urge the hooks 33 and 34 inwardly toward each other around the rivets 36 and 37 to thereby firmly and positively clamp the bumpers B' and B between the hooks 33 and 34 of the clamps 14 and 16, respectively, as best seen in Figs. 1 and 2. It will be seen that, with the clamps 14 and 16 operatively engaged with the respective structural members such as the bumpers B' and B, increased pull on the chain between the clamps 14 and 16 is effective to more firmly clamp the hooks 33 and 34 onto the structural members and, therefore, the harder the pull necessary to be exerted on the chain 12, the more tightly are the clamps 14 and 16 clampingly engaged with their respective structural members.

After the towing operation has been completed, the automobiles A and A' may be positioned sufficiently close to each other to afford slack in the tow lines 12, and the clamps 14 and 16 may then be quickly and easily removed from the bumpers B and B' by manually moving the hook members 33 and 34 into the open position shown in broken lines in Fig. 3 and lifting the clamps 14 and 16 from the bumpers B and B'.

In the form of my invention shown in Fig. 1 of the drawings, the towing device 10 is shown with a clamp 14 and a clamp 16 mounted on each respective end of the tow line 12. This affords an effective towing device which may be carried in a vehicle in unattached relation thereto and which, when the need arises therefor, may be quickly and easily mounted in operative position between a suitable structural member such as a bumper, axle, frame member, or the like, of a vehicle to be towed and a similarly suitable structural member of a vehicle which is to do the towing. However, it is to be understood that my invention is not limited to a towing device having two clamps thereon, and that the towing device may have more than two clamping devices thereon such as shown in Fig. 7, or may have only one clamping device, such as the clamp 14 or 16, on a tow line, such as the tow line 12, and the other end of the tow line may be otherwise connected to its respective vehicle by suitable means such as, for example, the hitch 70 shown in Fig. 8.

In the form of my invention shown in Fig. 7, four clamping devices 14, 14a, 16 and 16a of the same construction as the clamping devices 14 and 16 shown in Figs. 1 to 6, inclusive, are mounted on the outer ends of chains 18, 18a, 20 and 20a, respectively, the inner ends of which chains 18, 18a, 20 and 20a are mounted on the ring 19 to afford a tow line 12a. With this arrangement of my novel clamping devices 14, 14a, 16 and 16a, it will be seen that two clamping devices at each end of the tow line 12a may be readily connected to a respective one of the vehicles in spaced relation thereon to thereby distribute the load thereacross and promote equal pulling on both sides of the vehicles. Thus, for example, as shown in Fig. 7, the clamping devices 14 and 14a may be secured to the bumper B' of the vehicle to be pulled on opposite sides of, and at equal distances from the longitudinal center-line of the vehicle A', and, likewise, the clamping devices 16 and 16a may be similarly secured to the bumper B of the towing vehicle B.

The construction and operation of my novel clamping devices 14, 14a, 16 and 16a are such, as previously explained, that upon tension being applied to the tow line 12a each of the clamps 14, 14a, 16 and 16a firmly engage the respective structural member B' or B to which it is attached and firmly secures the tow line thereto at that position. This, it will be seen, enables an equal pull to be simultaneously exerted on both sides of a vehicle and tends to prevent either the pulling or pulled vehicle from sloughing sideways during a towing operation.

In Fig. 8, a tow line 12b, comprising only the single length of chain 18 shown in Figs. 1 to 6, inclusive, is shown mounted on the towing vehicle A by means of a hitch 70. The hitch 70 comprises a suitable plate 72 projecting from the vehicle A and normally forming a permanent part thereof, and a clevis 74 removably connected to the plate 72 by a bolt 76. When a towing device embodying my invention and having only one clamping device, such as the clamp 14 or 16, thereon is to be used, the clevis 74 may be inserted through a suitable portion of the tow line 12 such as, for example, the ring 22, and the clevis 74 may then be secured to the plate 72 by the bolt 76, and the other end of the tow line 12 may then be connected to the other vehicle by the clamp 14 as previously described.

This latter form of connection, wherein the tow line 12 is connected to one of the vehicles by a permanent or semipermanent connection such as the hitch 70, is particularly suitable for use on tow trucks, and the like, wherein it is convenient to have one end of the tow line connected to the towing vehicle at all times so that it is only necessary for the operator to connect the other end of the tow line to the vehicle to be towed to prepare for the towing operation.

From the foregoing, it will be seen that I have afforded a novel towing device which is efficient in operation and may be quickly and easily mounted on and removed from vehicles, and the like, and is operative in a novel and expeditious manner to afford a reliable towing device for towing an automobile, or the like.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A towing device comprising two elongated bars disposed in substantially parallel spaced relation to each other, the central portions of said bars being bowed outwardly away from each other, two substantially L-shaped clamping members each having a long leg and a short leg projecting from one end of said long leg, said short legs projecting from said long legs generally toward each other, each of said long legs having another end portion mounted between said bars at a respectve end thereof, at least one of said long legs being pivotally mounted on said bars to permit relative movement of said short legs toward and away from each other, and means for urging said clamping members into clamping engagement with a portion of a vehicle to be towed, with said short legs disposed on the opposite side of said portion of the vehicle from said bars, when said portion of the vehicle is disposed in operative position between said clamping members, said means comprising a tension coil spring extending between and connected to said long legs between said short legs and said bars, a tow line extending between said central portions of said bars, and link members mounted on said tow line and connected to said long legs between said short legs and said bars.

2. In a towing device, an elongated base having an opening extending through the longitudinal center portion thereof, two substantially L-shaped clamping members, each of said members having a long leg, and a short leg projecting from one end of said long leg, said short legs projecting from said long legs generally toward each other, each of said long legs having another end portion, said other end portions of said long legs being pivotally mounted on respective ends of said base in position to permit swinging movement of said short legs toward and away from each other, and means for urging said clamping members into clamping engagement with a portion of a vehicle to be towed, with said short legs disposed on the opposite side of said portion of said vehicle from said base, when said portion of said vehicle is disposed in operative position between said clamping members, said means comprising a tension coil spring extending between and attached to said long legs between said short legs and said base, a tow line extending through said opening in said base, and two link members attached to said tow line, each of said link members being attached to a respective one of said long legs between said short legs and said base.

References Cited in the file of this patent
UNITED STATES PATENTS

| | | |
|---|---|---|
| 607,571 | Paulson | July 19, 1898 |
| 673,263 | Hitchings et al. | Apr. 30, 1901 |
| 1,355,640 | Butler | Oct. 12, 1920 |
| 1,845,859 | Williamson | Feb. 16, 1932 |
| 2,659,609 | Johnson | Nov. 17, 1953 |